(12) United States Patent  
Schoenly et al.

(10) Patent No.: US 9,862,392 B2  
(45) Date of Patent: Jan. 9, 2018

(54) COMMUNICATION SYSTEM AND METHOD OF A VEHICLE CONSIST (71) Applicant: General Electric Company, Schenectady, NY (US)

(72) Inventors: Scott Alan Schoenly, Melbourne, FL (US); Steven Andrew Kellner, Melbourne, FL (US); Robert James Foy, Melbourne, FL (US); David Michael Peltz, Melbourne, FL (US); Eugene Smith, Melbourne, FL (US); James Glen Corry, Melbourne, FL (US); Joseph Mario Nazareth, Melbourne, FL (US); Brian William Schroeck, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 27 days.

(21) Appl. No.: 14/881,445

(22) Filed: Oct. 13, 2015

(65) Prior Publication Data  
US 2016/0229422 A1 Aug. 11, 2016

Related U.S. Application Data (63) Continuation-in-part of application No. 14/616,795, filed on Feb. 9, 2015, now abandoned.

(51) Int. Cl.  
G05D 1/00 (2006.01)  
G05D 3/00 (2006.01)  
G06F 7/00 (2006.01)  
G06F 17/00 (2006.01)  
B61C 17/12 (2006.01)  
B61L 3/00 (2006.01)  
(Continued)

(52) U.S. Cl.  
CPC .............. B61C 17/12 (2013.01); B61L 3/006 (2013.01); B61L 15/0072 (2013.01); B61L 15/0018 (2013.01); H04W 72/0406 (2013.01)

(58) Field of Classification Search  
CPC ...... B61C 17/12; B61L 3/006; B61L 15/0072; B61L 15/0018; H04W 72/0406  
USPC ......................................................... 701/20  
See application file for complete search history.

(56) References Cited

U.S. PATENT DOCUMENTS

7,038,597 B2 5/2006 Smith  
7,395,141 B1 7/2008 Seck  
7,430,967 B2 10/2008 Kumar  
(Continued)

Primary Examiner — Calvin Cheung  
Assistant Examiner — Paula L Schneider  
(74) Attorney, Agent, or Firm — Global Patent Operation; John A. Kramer (57) ABSTRACT A communication system and method receive, at an energy management system disposed onboard a vehicle system formed from a lead vehicle and one or more remote vehicles, trip data that represents one or more characteristics of an upcoming trip of the vehicle system along a route. A selected portion of the trip data is communicated from the energy management system to a distributed power system also disposed onboard the vehicle system. The selected portion includes identifying information and one or more orientations of the one or more remote vehicles. Using the distributed power system, communication links between the lead vehicle and the one or more remote vehicles are established using the identifying information and the one or more orientations.

20 Claims, 4 Drawing Sheets (51) Int. Cl.
  *H04W 72/04* (2009.01)
  *B61L 15/00* (2006.01)

(56) References Cited

U.S. PATENT DOCUMENTS

| | | |
|---|---|---|
| 7,762,631 B2 | 7/2010 | Smith |
| 8,239,078 B2 | 8/2012 | Siddappa |
| 8,280,566 B2 | 10/2012 | Foy, III |
| 8,310,979 B2 | 11/2012 | Mason |
| 8,364,338 B2 | 1/2013 | Peltonen |
| 8,522,690 B2 | 9/2013 | Smith |
| 8,825,239 B2 | 9/2014 | Cooper |
| 2008/0154452 A1* | 6/2008 | Kapp ................. B61L 3/006 701/20 |
| 2014/0005863 A1* | 1/2014 | Linares ............. B61L 15/0036 701/19 |
| 2014/0136031 A1* | 5/2014 | Burnett ............... B61C 17/12 701/19 |
| 2015/0088344 A1* | 3/2015 | Shakal ................. B61C 17/12 701/20 |

* cited by examiner

COMMUNICATION SYSTEM AND METHOD OF A VEHICLE CONSIST

CROSS-REFERENCE TO RELATED APPLICATIONS

This application is a continuation-in-part of U.S. patent application Ser. No. 14/616,795, which was filed on 9 Feb. 2015, and the entire disclosure of which is incorporated herein by reference.

FIELD

Embodiments of the inventive subject matter described herein relate to communications between vehicles in a vehicle consist and/or communications with the vehicle consists and other locations (e.g., off-board locations).

BACKGROUND

Some known vehicle consists include several propulsion-generating vehicles that generate tractive effort for propelling the vehicle consists along a route. For example, trains may have several locomotives coupled with each other that propel the train along a track. The locomotives may communicate with each other in order to coordinate the tractive efforts and/or braking efforts provided by the locomotives. As one example, locomotives may be provided in a distributed power (DP) arrangement with one locomotive designated as a lead locomotive and other locomotives designated as remote locomotives. The lead locomotive may direct the tractive and braking efforts provided by the remote locomotives during a trip of the consist.

Some known consists use wireless communication between the locomotives for coordinating the tractive and/or braking efforts. For example, a lead locomotive can issue commands to the remote locomotives. The remote locomotives receive the commands and implement the tractive efforts and/or braking efforts directed by the commands.

Before the remote vehicles will operate according to command messages received from a lead locomotive, however, communication links between the lead locomotive and the remote locomotive may need to be established. A communication "handshake" between the lead and remote locomotives may need to occur so that the remote locomotives can identify the lead locomotive, the lead locomotive can identify the remote locomotives, and the remote locomotives can determine that forthcoming command messages are received from the lead locomotive and not from another locomotive. In order to establish the communication links used to remotely control the remote locomotives from the lead locomotive, some known systems require an operator to go onboard each of the remote locomotives, manually input information about the lead locomotive and/or remote locomotives, and initiate communication of one or more wireless messages from the remote locomotives to the lead locomotive. In some vehicle consists having many remote locomotives, requiring an operator to enter onboard and manually enter this type of information onboard each remote locomotive can be very time-consuming and susceptible to human errors in entering the correct information. As a result, considerable time and effort may be expended in establishing communication links between the lead and remote locomotives in a vehicle consist.

BRIEF DESCRIPTION

In one embodiment, a method (e.g., for communicatively linking vehicles in a vehicle consist) includes determining a vehicle identifier for a first remote vehicle included in a vehicle consist formed from a lead vehicle and at least the first remote vehicle, communicating a linking message addressed to the vehicle identifier from the lead vehicle to the first remote vehicle, and establishing a communication link between the lead vehicle and the first remote vehicle responsive to receipt of the linking message at the first remote vehicle. The communication link can be established such that movement of the first remote vehicle is remotely controlled from the lead vehicle via the communication link. The communication link can be established without an operator entering the first remote vehicle. The messages may be communicated via wired and/or wireless connections.

In another embodiment, a system (e.g., a communication system) includes a control unit and a communication unit. The control unit can be configured to determine a vehicle identifier for a first remote vehicle included in a vehicle consist formed from a lead vehicle and at least the first remote vehicle. The communication unit can be configured to communicate a linking message addressed to the vehicle identifier from the lead vehicle to the first remote vehicle. The communication unit also can be configured to establish a communication link between the lead vehicle and the first remote vehicle responsive to receipt of the linking message at the first remote vehicle. The control unit can be configured to remotely control movement of the first remote vehicle from the lead vehicle via the communication link. The communication link can be established without an operator entering the first remote vehicle.

In another embodiment, a method (e.g., for communicatively linking vehicles in a vehicle consist) includes receiving unique vehicle identifiers of remote vehicles included in a vehicle consist with a lead vehicle, communicating linking messages with the unique vehicle identifiers to the remote vehicles, and responsive to the unique vehicle identifiers in the linking messages matching the remote vehicles in the vehicle consist, establishing one or more communication links between the lead vehicle and the remote vehicles to permit the lead vehicle to remotely control movement of the remote vehicles included in the vehicle consist. The one or more communication links are established without an operator being onboard the remote vehicles to communicate responsive messages from the remote vehicles to the lead vehicle.

In another embodiment, a method (e.g., for communicatively linking vehicles in a vehicle consist) includes determining a first unique vehicle identifier for a first remote vehicle and a second unique vehicle identifier for a second remote vehicle included in a vehicle consist formed from a lead vehicle, the first remote vehicle, and the second remote vehicle, detecting a single instance of an operator actuating an input device onboard the lead vehicle, communicating from the lead vehicle a first wireless linking message addressed to the first unique vehicle identifier to the first remote vehicle and communicating a second wireless linking message addressed to the second unique vehicle identifier to the second remote vehicle responsive to detecting the single instance of the operator actuating the input device, establishing a first communication link between the lead vehicle and the first remote vehicle responsive to receipt of the first wireless linking message at the first remote vehicle and a second communication link between the lead vehicle and the second remote vehicle responsive to receipt of the second wireless linking message at the second remote vehicle (where the communication link is established without an operator entering the first remote vehicle or the second remote vehicle), and remotely controlling movement of the first remote vehicle and the second remote vehicle from the lead vehicle via the first communication link and the second communication link, respectively. Communicating the wireless linking message can include broadcasting the first wireless linking message and the second wireless linking message such that the first remote vehicle receives the first wireless linking message and the second remote vehicle receives the second wireless linking message and at least one other remote vehicle that is located within a wireless communication range of the lead vehicle but that is not included in the vehicle consist receives at least one of the first wireless linking message or the second wireless linking message. Establishing the first communication link between the lead vehicle and the first remote vehicle and the second communication link between the lead vehicle and the second remote vehicle can include preventing the at least one other remote vehicle from establishing a communication link with the lead vehicle based at least in part on the first unique vehicle identifier or the second unique vehicle identifier.

In another embodiment, a method (e.g., for communicatively linking vehicles in a vehicle system) includes receiving, at an energy management system disposed onboard a vehicle system formed from a lead vehicle and one or more remote vehicles, trip data that represents one or more characteristics of an upcoming trip of the vehicle system along a route and communicating a selected portion of the trip data from the energy management system to a distributed power system also disposed onboard the vehicle system. The selected portion includes identifying information and one or more orientations of the one or more remote vehicles. The method also includes establishing, using the distributed power system, wireless communication links between the lead vehicle and the one or more remote vehicles using the identifying information and the one or more orientations.

In another embodiment, a system (e.g., a communication system) includes an energy management system and a control unit. The energy management system is configured to be disposed onboard a vehicle system formed from a lead vehicle and one or more remote vehicles, the energy management system configured to receive trip data that represents one or more characteristics of an upcoming trip of the vehicle system along a route. The control unit is configured to be disposed onboard the vehicle system and to establish wireless communication links between the lead vehicle and the one or more remote vehicles. The energy management system is configured to communicate a selected portion of the trip data to the control unit. The selected portion includes identifying information and one or more orientations of the one or more remote vehicles. The control unit is configured to establish the wireless communication links using the identifying information and the one or more orientations.

BRIEF DESCRIPTION OF THE DRAWINGS

Reference is now made briefly to the accompanying drawings, in which.

DETAILED DESCRIPTION

One or more embodiments of the inventive subject matter described herein provides for methods and systems for communicating between propulsion-generating vehicles in a vehicle consist. This subject matter may be used in connection with rail vehicles and rail vehicle consists, or alternatively may be used with other types of vehicles. The vehicle consist can include two or more vehicles mechanically coupled with each other to travel along a route together. Optionally, the vehicle consist can include two or more vehicles that are not mechanically coupled with each other, but the travel along a route together. For example, two or more automobiles may wirelessly communicate with each other as the vehicles travel along the route in order to coordinate movements with each other.

In operation, a lead vehicle can obtain unique vehicle identifiers associated with the remote vehicles included in the same vehicle consist as the lead vehicle. These vehicle identifiers may not include identifiers associated with remote vehicles that are not included in the vehicle consist. The vehicle identifiers may be obtained from a system such as a vehicle control system that restricts movement of vehicle consists based on locations of the vehicle consists. For example, such a system may include a positive train control (PTC) system. Optionally, the vehicle identifiers may be obtained from an energy management system, such as a system that creates a trip plan that designates operational settings of the vehicle consist as a function of time and/or distance along a route to control movement of the vehicle consist. Additionally or alternatively, the vehicle identifiers of the remote vehicles in the vehicle consist may be manually input by an operator or obtained from another system.

The lead vehicle can communicate wireless linking messages to the remote vehicles. These linking messages may be addressed to the remote vehicles using the vehicle identifiers. For example, the linking messages may include the vehicle identifiers. Vehicles that receive the linking messages other than the remote vehicles in the consist may not be linked with the lead vehicle due to the vehicle identifiers not matching or being associated with these other vehicles. At the remote vehicles that are included in the vehicle consist, the remote vehicles may be communicatively linked with the lead vehicle. For example, the remote vehicles may communicate linking confirmation messages responsive to receiving the linking messages.

The remote vehicles can communicate these confirmation messages without an operator having to enter onboard the remote vehicles. For example, while an operator may be onboard the lead vehicle, the operator may not enter onboard any other vehicles in the vehicle consists in order to establish communication links between the lead and remote vehicles in the vehicle consists. Upon receiving the confirmation messages at the lead vehicle, communication links between the lead and remote vehicles are established. Establishing these communication links allows for the lead vehicle to remotely control operations of the remote vehicles during movement of the vehicle consists along the route. For example, the lead vehicle can communicate wireless command messages to change throttle settings, brake settings, speeds, power outputs, or the like of the remote vehicles during movement of the vehicle consists. Other vehicles that do not have communication links established with the lead vehicle cannot be remotely controlled by the lead vehicle.

Figure 1:
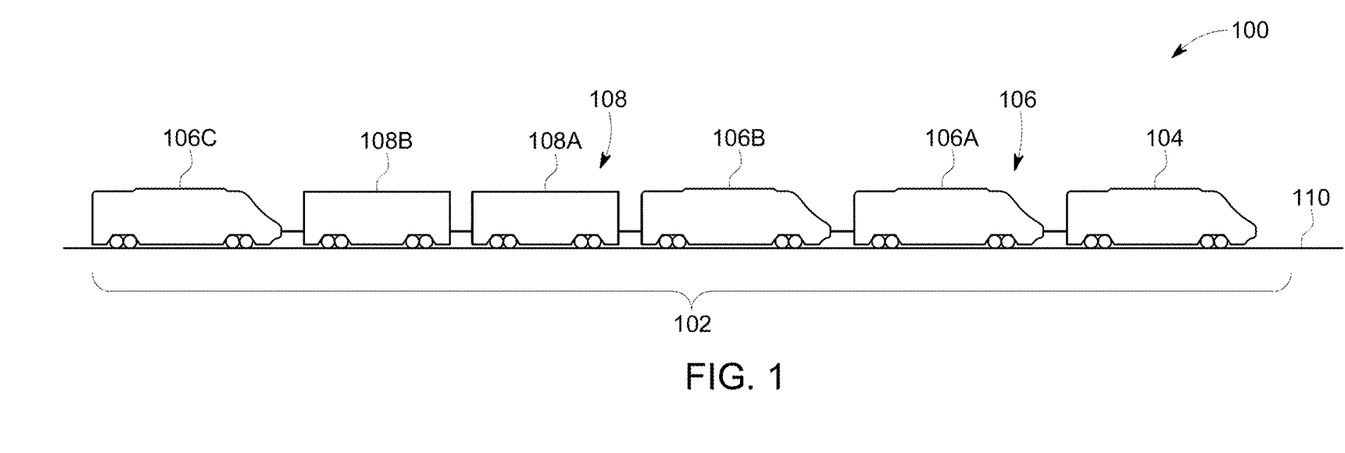
FIG. 1 illustrates one embodiment of a communication system of a vehicle consist or vehicle system.

FIG. 1 illustrates one embodiment of a communication system 100 of a vehicle consist or vehicle system 102. The illustrated vehicle consist 102 includes propulsion-generating vehicles 104, 106 (e.g., vehicles 104, 106A, 106B, 106C) and non-propulsion-generating vehicles 108 (e.g., vehicles 108A, 108B) that travel together along a route 110. Although the vehicles 104, 106, 108 are shown as being mechanically coupled with each other, optionally, the vehicles 104, 106, 108 may not be mechanically coupled with each other.

The propulsion-generating vehicles 104, 106 are shown as locomotives, the non-propulsion-generating vehicles 108 are shown as rail cars, and the vehicle consist 102 is shown as a train in the illustrated embodiment. Alternatively, the vehicles 104, 106 may represent other vehicles, such as automobiles, marine vessels, or the like, and the vehicle consist 102 can represent a grouping or coupling of these other vehicles. The number and arrangement of the vehicles 104, 106, 108 in the vehicle consist 102 are provided as one example and are not intended as limitations on all embodiments of the subject matter described herein.

In one embodiment, the group of vehicles 104, 106, 108 may be referred to as a vehicle system, with groups of one or more adjacent or neighboring propulsion-generating vehicles 104 and/or 106 being referred to as a vehicle consist. For example the vehicles 104, 106A, 106B, 108A, 108B, and 106C may be referred to as a vehicle system with vehicles 104, 106A, 106B be referred to as a first vehicle consist of the vehicle system and the vehicle 106C referred to as a second vehicle consist in the vehicle system. Alternatively, the vehicle consists may be defined as the vehicles that are adjacent or neighboring to each other, such as a vehicle consist defined by the vehicles 104, 106A, 106B, 108A, 108B, 106C.

The propulsion-generating vehicles 104, 106 can be arranged in a distributed power (DP) arrangement. For example, the propulsion-generating vehicles 104, 106 can include a lead vehicle 104 that issues command messages to the other propulsion-generating vehicles 106A, 106B, 106C which are referred to herein as remote vehicles. The designations "lead" and "remote" are not intended to denote spatial locations of the propulsion-generating vehicles 104, 106 in the vehicle consist 102, but instead are used to indicate which propulsion-generating vehicle 104, 106 is communicating (e.g., transmitting, broadcasting, or a combination of transmitting and broadcasting) command messages and which propulsion-generating vehicles 104, 106 are being remotely controlled using the command messages. For example, the lead vehicle 104 may or may not be disposed at the front end of the vehicle consist 102 (e.g., along a direction of travel of the vehicle consist 102). Additionally, the remote vehicles 106A-C need not be separated from the lead vehicle 104. For example, a remote vehicle 106A-C may be directly coupled with the lead vehicle 104 or may be separated from the lead vehicle 104 by one or more other remote vehicles 106A-C and/or non-propulsion-generating vehicles 108.

The command messages may include directives that direct operations of the remote vehicles. These directives can include propulsion commands that direct propulsion subsystems of the remote vehicles to move at a designated speed and/or power level, brake commands that direct the remote vehicles to apply brakes at a designated level, and/or other commands. The lead vehicle 104 issues the command messages to coordinate the tractive efforts and/or braking efforts provided by the propulsion-generating vehicles 104, 106 in order to propel the vehicle consist 102 along a route 110, such as a track, road, waterway, or the like.

The command messages can be communicated using the communication system 100. In one embodiment, the command messages are wirelessly communicated using the communication system 100. The communication system 100 may include wireless transceiving hardware and circuitry disposed onboard two or more of the vehicles 104, 106. Prior to the remote vehicles being remotely controlled by a lead vehicle in the vehicle consists, communication links may be established between the lead and remote vehicles.

In order to establish a communication link between a lead vehicle and a remote vehicle, the lead vehicle may wirelessly communicate a linking message to the remote vehicle. This linking message may include a unique code, such as a unique vehicle identifier, that is associated with the remote vehicle. This code may not be associated with or otherwise identify other remote vehicles in one embodiment. Alternatively, the vehicle identifier may identify or be associated with two or more remote vehicles, such as two or more remote vehicles that are the same type of vehicle, there included in the vehicle consists, or the like. At the remote vehicle that receives linking message, if the vehicle identifier in the linking message matches, is associated with, or otherwise identifies the remote vehicle, then the remote vehicle may communicate a confirmation message back to the lead vehicle. This confirmation message may be wirelessly communicated to the lead vehicle. The communication link between the lead and remote vehicles may be established responsive to the linking message being received by the remote vehicle and a confirmation message being received by the lead vehicle. Alternatively, the communication link between the lead and remote vehicles may be established once the linking message is received at the remote vehicles, without requiring a confirmation message from being received back at the lead vehicle.

The lead vehicle may determine vehicle identifiers for the remote vehicles by receiving a list of unique identifying codes associated with the remote vehicles in the vehicle consist. This list may be received from one or more systems other than the communication system 100, such as a vehicle control system that restricts movement of the vehicle consists based at least in part on the location of the vehicle consists. One example of such a vehicle control system includes a positive train control or PTC system. Another example of such a system may include an energy management system that creates a trip plan to control movement of the vehicle consist. The trip plan can designate operational settings of the vehicle consist as a function of time and/or distance along the route. The operational settings designated by the trip plan can reduce fuel consumed and/or emissions generated by the vehicle consist relative to the vehicle consist traveling according to other operational settings. For example, operating the vehicle consist according to the operational settings designated by the trip plan can reduce the fuel consumed and/or emissions generated by the vehicle consist relative to the same vehicle consist traveling over the same route for the same trip using different operational settings (e.g., those settings that cause the vehicle consist to travel at the upper speed limit or track speed of the route). Alternatively, the vehicle identifiers may be received from another type of system, such as a dispatch facility, a vehicle yard such as a rail yard, or the like. In one aspect, and operator may manually input the vehicle identifiers onboard the lead vehicle.

In contrast to some known systems, operators are not required to enter onboard the remote vehicles to identify these remote vehicles to the lead vehicle. Instead, the remote vehicles are identified by a separate system such that the operators do not need to enter onboard the remote vehicles in order to determine which remote vehicles are in the vehicle consist. As a result, communication links between the lead and remote vehicles may be established without requiring operators to enter onboard the remote vehicles. Consequently, considerable time and effort can be saved by avoiding requiring the operators to enter onboard the remote vehicles.

Figure 2:
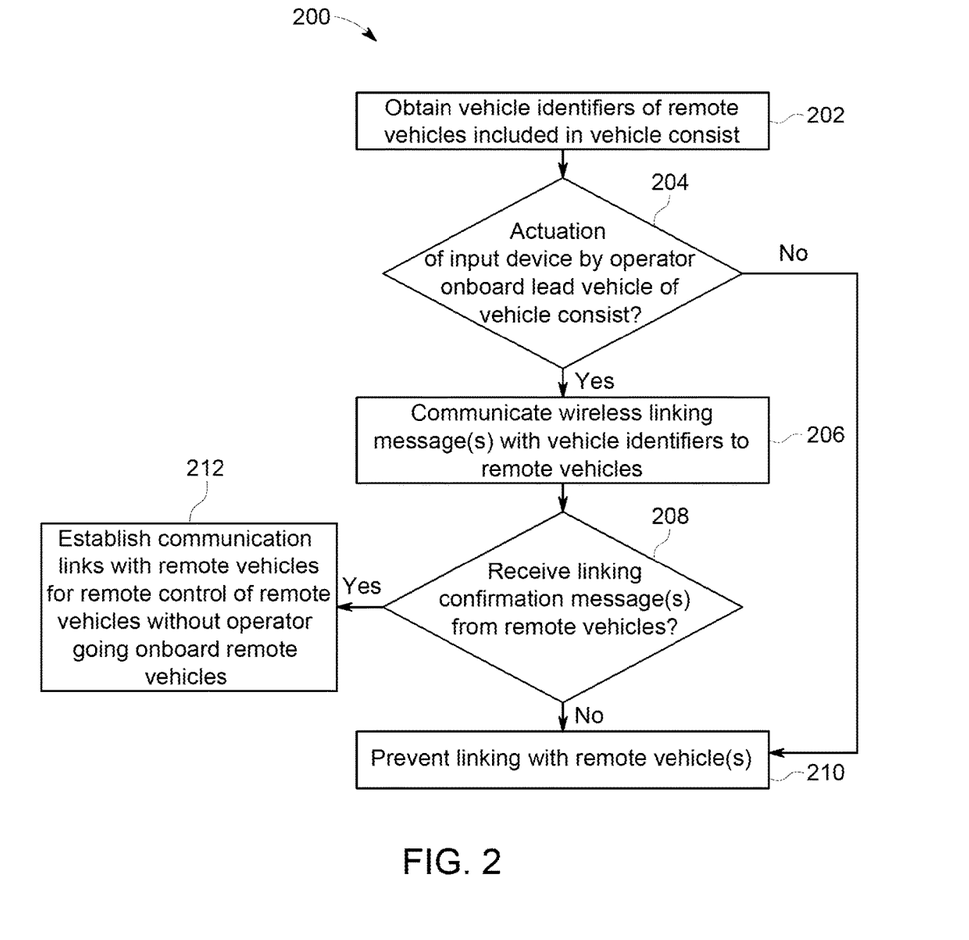
FIG. 2 illustrates a flowchart of one embodiment of a method for communicatively linking vehicles in a vehicle consist.

FIG. 2 illustrates a flowchart of one embodiment of a method 200 for communicatively linking vehicles in a vehicle consist. The method 200 may be performed by communication system 100 shown in FIG. 1. At 202, the vehicle identifiers of remote vehicles included in the vehicle consist are obtained. The vehicle identifiers may be obtained from a system other than the communication system, such as a vehicle control system, energy management system, a dispatch facility, or the like. Optionally, the vehicle identifiers may be input by an operator onboard the lead vehicle. The vehicle identifiers that are obtained may be unique codes that uniquely identify the remote vehicles included in the vehicle consist, and that do not include vehicles that are not included in the vehicle consist. For example, the vehicles that are included in the vehicle consist may already be mechanically linked and/or otherwise positioned near one another to travel together along the route as a consist. The vehicle identifiers that are obtained may represent those vehicles in the consist, and not any vehicles not included in the consist.

In one aspect, the vehicle identifiers may be obtained in addition to orientations of the remote vehicles. The orientations can indicate the directions that the remote vehicles are facing in the vehicle consist, as described below. The vehicle identifiers and/or orientations may be obtained from data that is communicated from an off-board location to one or more onboard systems, such as an energy management system (as described below).

At 204, a determination is made as to whether or not an input device onboard the lead vehicle of the vehicle consists has been actuated. For example, a determination may be made as to whether or not an operator has pressed a button, flip the switch, moved a lever, typed on a keyboard, touched a touch-sensitive display screen, spoken commands into a microphone, or the like. Actuation of an input device may indicate that the operator wishes to initiate establishment of the communication links between the lead and remote vehicles in the consist. For example, once the vehicle identifiers and/or orientations of the remote vehicles in the consist have been obtained, the operator onboard lead vehicle can press a single button (or otherwise perform a single actuation of an input device) to initiate the establishment of communication links between the lead and remote vehicles. Alternatively, the operator may actuate the same input device several times and/or may actuate multiple input devices to cause the linking messages to be sent. If the input device has been actuated, flow of the method 200 can continue to 206. On the other hand, if the input device is not actuated, then flow of the method 200 can proceed to 210, described below.

At 206, linking messages are communicated to the remote vehicles in the consist. These linking messages may be wirelessly communicated from the lead vehicle to the remote vehicles. Linking messages may be addressed to the remote vehicles. For example, the linking messages may include the vehicle identifiers of the remote vehicles included in the consist. Different linking messages may be communicated to different remote vehicles. For example, a first linking message having a first vehicle identifier may be communicated to a first remote vehicle, a second linking message having a different, second vehicle identifier may be communicated to a different, second remote vehicle, and so on. Optionally, one or more linking messages may include multiple vehicle identifiers. For example, a linking message may be wirelessly communicated from the lead vehicle and may include the vehicle identifiers of the remote vehicles included in the vehicle consist.

Onboard the remote vehicles, if a linking message is received that includes a vehicle identifier that matches or otherwise corresponds with the remote vehicle receiving the linking message, the remote vehicle may communicate a linking confirmation message back to the lead vehicle. This confirmation message may be wirelessly communicated to the lead vehicle to indicate or confirm receipt of the linking message. The linking confirmation messages may be communicated from the remote vehicles to lead vehicles without operators having to go onboard the remote vehicles. For example, responsive to a remote vehicle receiving a linking message from the lead vehicle that includes the vehicle identifier of the remote vehicle, the remote vehicle may autonomously (e.g., without operator intervention) wirelessly communicate the linking confirmation message to lead vehicle. Alternatively, the remote vehicles may not communicate a linking confirmation message responsive to receiving the linking message.

At 208, a determination is made as to whether or not a linking confirmation message is received at the lead vehicle from one or more of the remote vehicles in the vehicle consist. For example, the lead vehicle may determine if all remote vehicles included in the vehicle consist communicated linking confirmation messages responsive to communicating the linking messages. Receipt of the linking confirmation messages from all remote vehicles at the lead vehicle can indicate or confirm that the remote vehicles received the linking messages from the lead vehicle. Failure to receive linking confirmation messages or an absence of linking confirmation messages from all remote vehicles at the lead vehicle can indicate that one or more remote vehicles did not receive linking messages from the lead vehicle. In one aspect, the lead vehicle may re-communicate one or more additional linking messages to the remote vehicles from which the lead vehicle did not receive a linking confirmation message.

If it is determined that linking confirmation messages were received from all remote vehicles, then flow of the method can proceed to 212. Alternatively, if linking confirmation messages were not received from the remote vehicles, then flow the method 200 can proceed to 210.

At 210, communication linking between the lead and remote vehicles is prevented. For example, if the remote vehicles did not receive the linking messages, if the lead vehicle did not receive confirmation of receipt of the linking messages at the remote vehicles, and/or if an operator did not actuate any input device to initiate establishment of communication links between the lead and remote vehicles, the communication links between the lead vehicle and one or more remote vehicles may not be established. This can prevent communication links from being established between the lead and remote vehicles that are not included in the vehicle consist, prevent communication links from being established between the lead vehicle and remote vehicle that did not receive a linking message, and/or prevent communication links from being established between vehicles in the vehicle consist without the operator initiating formation of the communication links.

At 212, communication links between the lead vehicle and the remote vehicles are established. These communication links allow for the lead vehicle to remotely control operations and movement of the remote vehicles. For example, the communication links can allow the lead vehicle to issue command messages to the remote vehicles. The command messages may direct the remote vehicles to change throttle settings, brake settings, accelerations, speeds, power outputs, or the like. Upon receipt of the command messages, the remote vehicles may implement the changes in operational settings dictated by the command messages.

A communication link may be established by the lead vehicle identifying which remote vehicles are included in the vehicle consist, communicating linking messages to those remote vehicles, and receiving confirmation that the linking messages are received at the remote vehicles. The failure of the lead vehicle to determine which remote vehicles are included in the vehicle consist, the failure of the lead vehicle to communicate linking messages to those remote vehicles, or the failure of lead vehicle to receive confirmation that linking messages were received at the remote vehicles can prevent communication links from being established between the lead and remote vehicles. Alternatively, the communication links may be established by the lead vehicle identifying which remote vehicles are included in the vehicle consist and communicating linking messages to those remote vehicles, regardless of whether or not confirmation that the linking messages were received remote vehicles is received lead vehicle. For example, the communication links may be established without the remote vehicles communicating linking confirmation messages and/or without the lead vehicle receiving linking confirmation messages.

A communication link may be defined by a communication handshake between lead and remote vehicles. For example, communication of a first message from a lead vehicle to remote vehicle (e.g., a linking message) followed by successful communication of a second message from the remote vehicle to lead vehicle (e.g., a linking confirmation message) may be a communication handshake that establishes a communication link. Optionally, the communication link may be established by a dedicated communications channel being used between the lead and remote vehicles. For example, a designated frequency or frequency band may define a communication link.

The communication links between the lead and remote vehicles may be established without an operator having to go onboard the remote vehicles. As described above, the operator may go onboard the lead vehicle and, once the lead vehicle has determined which remote vehicles are included in the vehicle consist, the lead vehicle may establish communication links with the remote vehicles without the operator or other operators having to go onboard the remote vehicles to communicate information from the remote vehicles to the lead vehicle. As a result, considerable time and effort may be saved in setting up a vehicle consist for travel.

Figure 3:
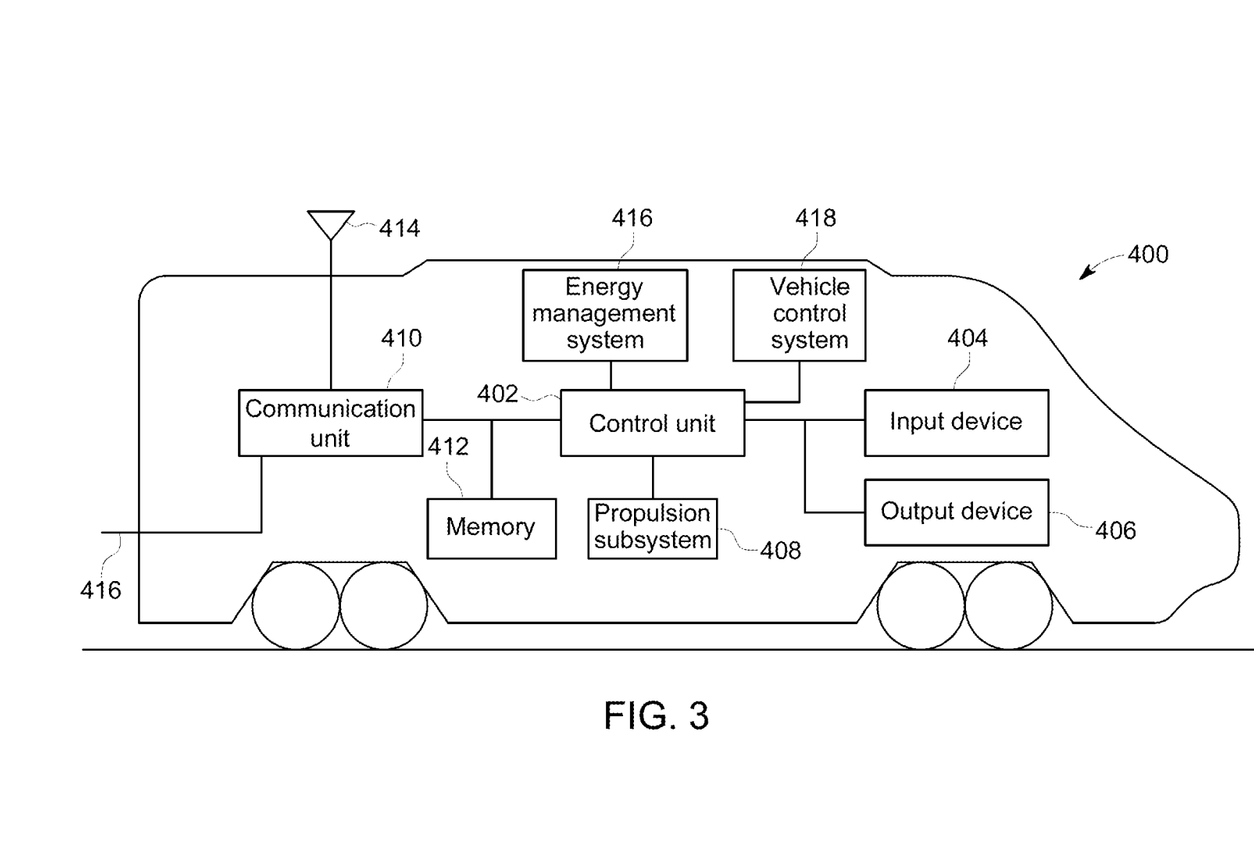
FIG. 3 is a schematic diagram of a propulsion-generating vehicle in accordance with one embodiment.

FIG. 3 is a schematic diagram of a propulsion-generating vehicle 400 in accordance with one embodiment. The vehicle 400 may represent one or more of the vehicles 104, 106 shown in FIG. 1. The communication system 100 shown in FIG. 1 may include one or more components onboard the vehicle 400 that are used to establish communication links between the vehicle 400 and one or more other vehicles in the same vehicle consist.

The vehicle 400 includes a control unit 402 that controls operations of the vehicle 400. The control unit 402 can include or represent one or more hardware circuits or circuitry that include, are connected with, or that both include and are connected with one or more processors, controllers, or other hardware logic-based devices. The control unit 402 is connected with an input device 404 and an output device 406. The control unit 402 can receive manual input from an operator of the propulsion-generating vehicle 400 through the input device 404, such as a touchscreen, keyboard, electronic mouse, microphone, or the like. For example, the control unit 402 can receive manually input changes to the tractive effort, braking effort, speed, power output, and the like, from the input device 404. The control unit 402 may receive a single instance of an actuation of the input device 404 to initiate the establishment of communication links between lead and remote vehicles in the vehicle consist. For example, instead of having one or more operators go onboard lead and remote vehicles of a consist in order to establish communication links for the remote control of the remote vehicles by the lead vehicles, an operator may go onboard the lead vehicle and press a single button or other input device to cause the lead vehicle to communicate linking messages to the remote vehicles in order to establish the communication links.

The control unit 402 can present information to the operator using the output device 406, which can represent a display screen (e.g., touchscreen or other screen), speakers, printer, or the like. For example, the control unit 402 can present the identities and statuses of the remote vehicles 106, identities of the missing remote vehicles 106 (e.g., those remote vehicles 106 from which the lead vehicle 104 has not received the status), contents of one or more command messages, or the like.

The control unit 402 is connected with a propulsion subsystem 408 of the propulsion-generating vehicle 400. The propulsion subsystem 408 provides tractive effort and/or braking effort of the propulsion-generating vehicle 400. The propulsion subsystem 408 may include or represent one or more engines, motors, alternators, generators, brakes, batteries, turbines, and the like, that operate to propel the propulsion-generating vehicle 400 under the manual or autonomous control that is implemented by the control unit 402. For example, the control unit 402 can generate control signals autonomously or based on manual input that is used to direct operations of the propulsion subsystem 408.

The control unit 402 also is connected with a communication unit 410 and a memory 412 of the communication system in the propulsion-generating vehicle 400. The memory 412 can represent an onboard device that electronically and/or magnetically stores data. For example, the memory 412 may represent a computer hard drive, random access memory, read-only memory, dynamic random access memory, an optical drive, or the like. The communication unit 410 includes or represents hardware and/or software that is used to communicate with other vehicles 400 in the vehicle consist 102. For example, the communication unit 410 may include a transceiver and associated circuitry (e.g., antennas) 414 for wirelessly communicating (e.g., communicating and/or receiving) linking messages, command messages, linking confirmation messages, reply messages, retry messages, repeat messages, or the like. Optionally, the communication unit 410 includes circuitry for communicating the messages over a wired connection 416, such as an electric multiple unit (eMU) line of the vehicle consist 102, catenary or third rail of electrically powered vehicle, or another conductive pathway between or among the propulsion-generating vehicles 104, 106, 400 in the vehicle consist 102. The control unit 402 may control the communication unit 410 by activating the communication unit 410. The communication unit 410 can examine the messages that are received by the vehicle 400. For example, the communication unit 410 of a remote vehicle 106 can examine received command messages to determine the directive sent by the lead vehicle 104. The directive can be conveyed to the control unit 402, which then implements the directive by creating control signals that are communicated to the propulsion subsystem 408 for autonomous control or by presenting the directive to the operator on the output device 406 for manual implementation of the directive.

The memory 412 can store vehicle identifiers. In the lead vehicle 104, the memory 412 can store the vehicle identifiers of the remote vehicles 106 in the same consist as the lead vehicle 104. In the remote vehicles 106, the memory 412 can store the vehicle identifier of the remote vehicle 106 in which the memory 412 is located (e.g., to allow the remote vehicle 106 to communicate the vehicle identifier), the vehicle identifier of the lead vehicle 104 (e.g., to allow the remote vehicle 106 to verify that received messages are sent from the lead vehicle 104 in the same consist), and/or other information.

The control unit 402 can obtain the vehicle identifiers from another system, such as a vehicle control system 418, an energy management system 416, or another system. The vehicle control system 418 shown in FIG. 3 can include hardware circuits or circuitry that include and/or are connected with one or more processors. The vehicle control system 418 can control or limit movement of the vehicle 400 and/or the vehicle consist that includes the vehicle 400 based on one or more limitations. For example, the vehicle control system 418 can prevent the vehicle and/or vehicle consist from entering into a restricted area, can prevent the vehicle and/or vehicle consist from exiting a designated area, can prevent the vehicle and/or vehicle consist from traveling at a speed that exceeds an upper speed limit, can prevent the vehicle and/or vehicle consist from traveling at a speed that is less than a lower speed limit, or the like. In one embodiment, the vehicle control system 418 includes or represents a positive train control system. The vehicle control system 418 may be programmed or otherwise have access to the vehicle identifiers of the vehicles included in the vehicle consist that includes the vehicle 400. For example, the vehicle control system 418 may store right access to the vehicle identifiers so that the vehicle control system 418 can determine how to control or limit control of the vehicle 400 and/or the vehicle consist that includes the vehicle 400 in order to prevent the vehicle 400 and/or vehicle consist from violating one or more of the limits.

The energy management system 416 can include hardware circuits or circuitry that include and and/or are connected with one or more processors. The energy management system 416 can create a trip plans for trips of the vehicle 400 and/or the vehicle consist that includes the vehicle 400. As described above, a trip plan may designate operational settings of the vehicle 400 and/or the vehicle consist as a function of time and/or distance along a route for a trip. Traveling according to the operational settings designated by the trip plan can reduce fuel consumed and/or emissions generated by the vehicle 400 and/or the vehicle consist relative to the vehicle 400 and/or vehicle consist traveling according to other operational settings that are not designated by the trip plan. The energy management system 416 may be programmed with or otherwise have access to the vehicle identifiers of the vehicles included in the vehicle consist. The identities of the vehicles in the consists may be known to energy management system 416 so that the energy management system 416 can determine what operational settings to designate for a trip plan in order to achieve a goal of reducing fuel consumed and/or emissions generated by the consists during the trip.

One or more of the vehicle control system 418, the energy management system 416, or another system may communicate or otherwise provide the vehicle identifiers to the control unit 402 and/or the communication unit 410. As described above, the communication unit 410 and/or the control unit 402 may communicate wireless linking messages that are addressed to the remote vehicles in the consist using the vehicle identifiers obtained from one or more of the systems.

Figure 4:
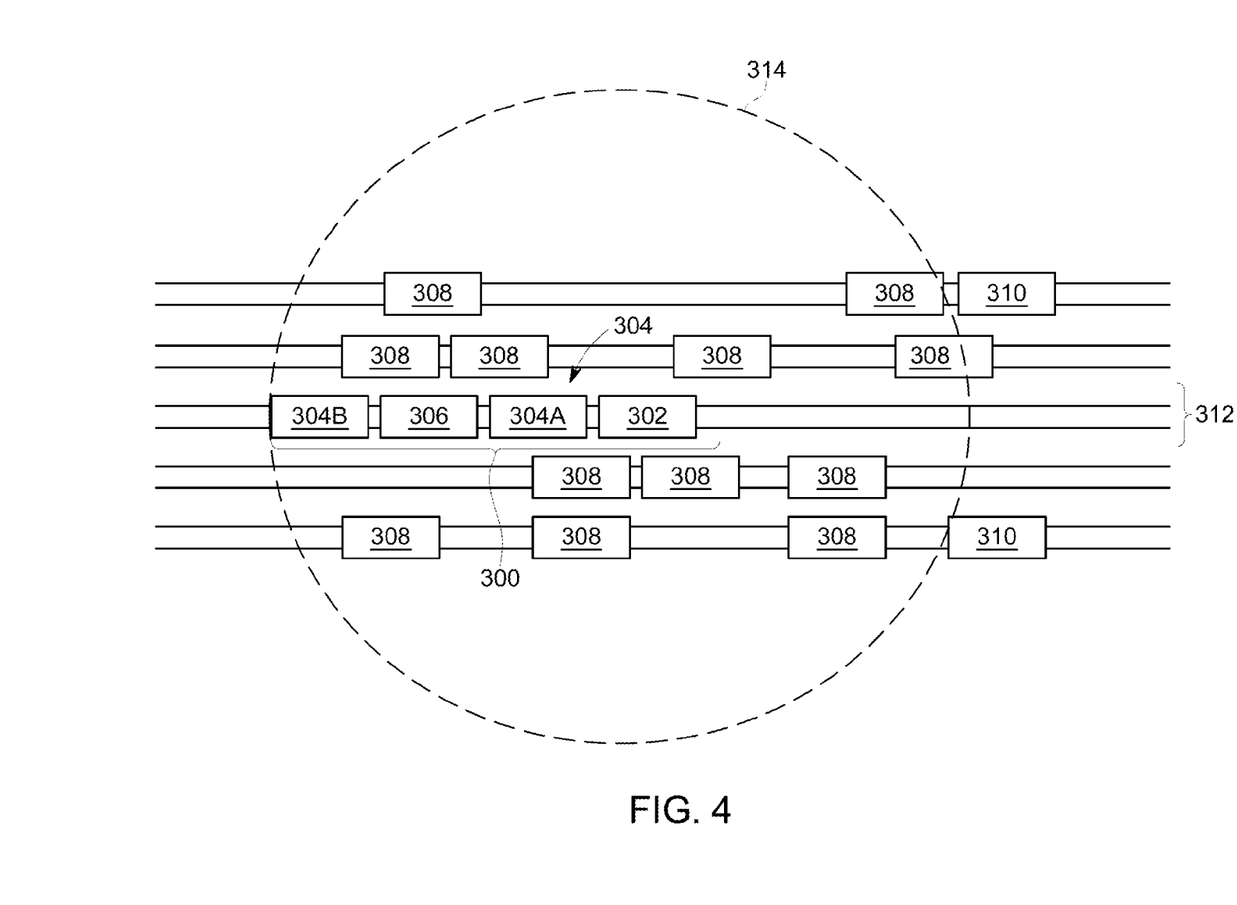
FIG. 4 illustrates several vehicles located on neighboring routes according to one example.

FIG. 4 illustrates several vehicles 302, 304 (e.g., 304A, 304B), 306, 308, 310 located on neighboring routes 312 according to one example. The vehicles 302, 304, 306, 308, 310 can represent one or more of the vehicles 104, 106, 108, 400 shown in FIGS. 1 and 3. The routes 312 may be relatively close to one another, such as within five, ten, fifteen, twenty, twenty-five meters or another distance apart. For example, the routes 312 may be neighboring tracks in a vehicle yard, such as a rail yard. Alternatively, the routes may be another type of route and/or another location.

The vehicles 302, 304, 306 may be grouped together in the vehicle consist 300. For example, the vehicle 302 may represent the lead vehicle 104 shown in FIG. 1, the vehicles 304A, 304B may represent remote vehicles 106 shown in FIG. 1, and the vehicle 306 may represent a non-propulsion-generating vehicle 108 shown in FIG. 1. Other vehicles 308, 310 shown in FIG. 4 are not included in the vehicle consist 300. For example, vehicles 308, 310 are not grouped with the vehicles 302, 304, 306 to travel with the vehicles 302, 304, 306 along a route 312. Instead, the vehicles 308, 310 may be included in another vehicle consist or may not be included in any vehicle consist.

The communication unit 410 (shown in FIG. 3) of the lead vehicle 302 may have a wireless communication range 314. The range 314 indicates how far wireless messages sent from the communication unit 410 of the lead vehicle 302 may be successfully communicated to another vehicle. In the illustrated example, the vehicles 304, 306, 308 are within the wireless range 314 lead vehicle 302, while the vehicles 310 are outside of the wireless range 314 the lead vehicle 302. As a result, wireless messages (such as wireless linking messages) communicated from the lead vehicle 302 may be received by the vehicles 304, 306, 308, but not received by the vehicles 310.

Communicating the wireless linking messages from the lead vehicle 302 with the vehicle identifiers of the remote vehicles 304A, 304B can prevent establishment of communication links with the vehicles 308 that are within the wireless range 314 of the lead vehicle 302, but that are not included in the vehicle consist 300 of the lead vehicle 302. For example, one or more of the vehicles 308 may receive a wireless linking message the lead vehicle 302. These vehicles 308 can examine the vehicle identifier or vehicle identifiers included in the wireless linking message to determine if the vehicle identifier or identifiers in the wireless linking message matches the vehicle identifier associated with the vehicle 308. Because the vehicle identifiers in the wireless linking messages do not match or otherwise correspond with the vehicles 308, the vehicles 308 may determine that the wireless linking messages are not addressed to the vehicles 308. As a result, the vehicles 308 do not establish a communication link with the lead vehicle and/or do not respond to the wireless linking message with a linking confirmation message sent back to lead vehicle 302. Because the vehicle identifiers included in the linking message do match or otherwise correspond with the remote vehicles 304A, 304B, these vehicles 304A, 304B do establish communication link with the lead vehicle 302 and/or establish the communication links by responding with a linking confirmation message.

In one embodiment, the data that is used by a distributed power system (for example, the control unit onboard the lead vehicle that establishes communication links for distributed power control) to establish the communication links may be obtained by another system onboard the vehicle consist. The onboard system of the lead vehicle can communicate with one or more off-board locations to wirelessly receive data signals from an off-board system that include consist makeup information. For example, the energy management system described herein can receive trip data for use in creating the trip plan described above. The trip data can include a variety of different types of information useful in creating the trip plan, such as locations or orders of the vehicles in the vehicle consist (e.g., positions along the length of the vehicle consist), an origin of the trip for which the trip plan is being created, a destination of the trip for which the trip plan is being created, weights of the vehicles in the vehicle consist, lengths of the vehicles in the vehicle consist, the number of propulsion-generating vehicles in the vehicle consist, the number of non-propulsion-generating vehicles in the vehicle consist, etc. The trip data may be communicated from an off-board system, such as a dispatch facility that wirelessly transmits or broadcasts the trip data to the energy management system.

In one embodiment, the trip data that is communicated to the energy management system from an off-board system may be modified to include additional or different types of information that the information described above. For example, the trip data may be modified by the off-board system to include additional information about the remote vehicles in the vehicle consist. This additional information can include the identifiers or identities of the remote vehicles in the vehicle consist and/or the orientation of the remote vehicles. The orientation of the remote vehicles can indicate the direction that each of the remote vehicles is facing. For example, the remote vehicles may be locally or remotely controlled to propel themselves in a forward direction or a rearward direction. Depending on the orientation of a remote vehicle, the movement of the remote vehicle in the forward direction or the rearward direction can cause the remote vehicle to move with or against other propulsion-generating vehicles in the vehicle consist. For example, if a remote vehicle has a first orientation such that the remote vehicle is facing a first direction (e.g., the short hood of a locomotive is facing east), then the remote vehicle will act to propel itself in the first direction when controlled to move in the forward direction and will act to propel itself in an opposite, second direction when controlled to move in the rearward direction. But, if the remote vehicle has an opposite, second orientation (e.g., the remote vehicle is facing the opposite, second direction), then the remote vehicle will act to propel itself in the second direction when controlled to move in the forward direction and act to propel itself in the first direction when controlled to move in the rearward direction. Not all of the remote vehicles may be oriented in the same direction in the vehicle consist. Some remote vehicles may be facing in one direction while one or more other remote vehicles face in an opposite direction.

The energy management system can create a trip plans for trips of the vehicle consist using the trip data that is received. In one aspect, the energy management system may not use all of the trip data to create the trip plan. For example, the energy management system may not use identities and/or orientations of the remote vehicles. The energy management system can communicate this part of the trip data to the control unit disposed onboard the lead vehicle of the vehicle consist. The energy management system can receive the trip data in several data packets (or another format) and extract or otherwise separate the remote vehicle identities and/or orientations from the other data included in the trip data. The energy management system may then generate the trip plan using the remaining data in the trip data (e.g., the trip data other than the remote vehicle identities and orientations). Alternatively, the energy management system may use the remote vehicle identities and/or orientations in generating the trip plan.

The energy management system can communicate the portion of the trip plan (e.g., the remote vehicle identities and/or orientations) to the control unit onboard the lead vehicle of the vehicle consist. This communication can occur automatically (e.g., without operator intervention) or in response to instructions or requests received from the operator. The control unit may then establish the communication links with the remote vehicles using the portion of the trip data received from the energy management system. For example, the control unit may display, on the output device, the remote vehicle identities and/or orientations. The operator onboard the lead vehicle may review and/or modify the identities and/or orientations (e.g., in a situation where the operator can see that an orientation or identity is incorrect) using the input device. The operator may then cause the control unit to create the communication links using the portion of the trip data (e.g., the remote vehicle identities and orientations). Similar to as described above, the operator may actuate the input device to cause the communication links to be established using the portion of the trip data, without the operator having to go onboard the remote vehicles.

In one aspect, the communication links between the lead and remote vehicles may not be established unless and until the orientations of the remote vehicles are known to (e.g., input into) the control unit. The control unit may not create the communication links until the orientations of the remote vehicles are known in order to prevent a remote vehicle having an opposite orientation than what is expected by the control unit of the lead vehicle from acting to propel the vehicle consist in an opposite direction than what is expected or desired or directed by the control unit of the lead vehicle.

In one embodiment, a method (e.g., for communicatively linking vehicles in a vehicle consist) includes determining a vehicle identifier for a first remote vehicle included in a vehicle consist formed from a lead vehicle and at least the first remote vehicle, communicating a wireless linking message addressed to the vehicle identifier from the lead vehicle to the first remote vehicle, and establishing a communication link between the lead vehicle and the first remote vehicle responsive to receipt of the wireless linking message at the first remote vehicle. The communication link can be established such that movement of the first remote vehicle is remotely controlled from the lead vehicle via the communication link. The communication link can be established without an operator entering the first remote vehicle.

In one aspect, establishing the communication link can include receiving a wireless linking confirmation message from the first remote vehicle at the lead vehicle responsive to the wireless linking message being received at the first remote vehicle.

In one aspect, determining the vehicle identifier can include receiving a list of one or more unique identifying codes associated with at least the first remote vehicle from a vehicle control system that restricts movement of the vehicle consist based at least in part on a location of the vehicle consist.

In one aspect, the vehicle control system can include a positive train control system.

In one aspect, determining the vehicle identifier can include receiving a list of one or more unique identifying codes associated with at least the first remote vehicle from an energy management system that creates a trip plan to control movement of the vehicle consist. The trip plan can designate operational settings of the vehicle consist as a function of one or more of time or distance along a route.

In one aspect, the vehicle consist includes the lead vehicle, the first remote vehicle, and at least a second remote vehicle. Determining the vehicle identifier can include determining a first unique vehicle identifier for the first remote vehicle and at least a second unique vehicle identifier for at least the second remote vehicle. Communicating the wireless linking message can include communicating a first wireless linking message to the first remote vehicle and communicating at least a second wireless linking message to at least the second remote vehicle. Establishing the communication link can include establishing a first communication link between the lead vehicle and the first remote vehicle and at least a second communication link between the lead vehicle and at least the second remote vehicle.

In one aspect, the method also can include detecting a single instance of an operator actuating an input device onboard the lead vehicle and communicating the first wireless linking message and the at least the second wireless linking message responsive to detecting the single instance of the operator actuating the input device.

In one aspect, communicating the wireless linking message can include broadcasting the wireless linking message such that the first remote vehicle receives the wireless linking message and at least one other remote vehicle that is located within a wireless communication range of the lead vehicle but that is not included in the vehicle consist receives the wireless linking message. Establishing the communication link between the lead vehicle and the first remote vehicle can include preventing the at least one other remote vehicle from establishing a communication link with the lead vehicle based at least in part on the vehicle identifier.

In another embodiment, a system (e.g., a communication system) includes a control unit and a communication unit. The control unit can be configured to determine a vehicle identifier for a first remote vehicle included in a vehicle consist formed from a lead vehicle and at least the first remote vehicle. The communication unit can be configured to communicate a wireless linking message addressed to the vehicle identifier from the lead vehicle to the first remote vehicle. The communication unit also can be configured to establish a communication link between the lead vehicle and the first remote vehicle responsive to receipt of the wireless linking message at the first remote vehicle. The control unit can be configured to remotely control movement of the first remote vehicle from the lead vehicle via the communication link. The communication link can be established without an operator entering the first remote vehicle.

In one aspect, the communication unit can be configured to receive a wireless linking confirmation message from the first remote vehicle at the lead vehicle responsive to the wireless linking message being received at the first remote vehicle.

In one aspect, the control unit can be configured to determine the vehicle identifier by receiving a list of one or more unique identifying codes associated with at least the first remote vehicle from a vehicle control system that restricts movement of the vehicle consist based at least in part on a location of the vehicle consist.

In one aspect, the vehicle control system can include a positive train control system.

In one aspect, the control unit can be configured to determine the vehicle identifier by receiving a list of one or more unique identifying codes associated with at least the first remote vehicle from an energy management system that creates a trip plan to control movement of the vehicle consist. The trip plan can designate operational settings of the vehicle consist as a function of one or more of time or distance along a route.

In one aspect, the vehicle consist can include the lead vehicle, the first remote vehicle, and at least a second remote vehicle. The control unit can be configured to determine the vehicle identifier by determining a first unique vehicle identifier for the first remote vehicle and at least a second unique vehicle identifier for at least the second remote vehicle. The communication unit can be configured to communicate the wireless linking message by communicating a first wireless linking message to the first remote vehicle and communicating at least a second wireless linking message to at least the second remote vehicle. The communication unit also can be configured to establish the communication link by establishing a first communication link between the lead vehicle and the first remote vehicle and at least a second communication link between the lead vehicle and at least the second remote vehicle.

In one aspect, the control unit can be configured to detect a single instance of an operator actuating an input device onboard the lead vehicle and the communication unit can be configured to communicate the first wireless linking message and the at least the second wireless linking message responsive to the control unit detecting the single instance of the operator actuating the input device.

In one aspect, the communication unit can be configured to communicate the wireless linking message by broadcasting the wireless linking message such that the first remote vehicle receives the wireless linking message and at least one other remote vehicle that is located within a wireless communication range of the communication unit but that is not included in the vehicle consist receives the wireless linking message. The communication unit can be configured to prevent the at least one other remote vehicle from establishing a communication link with the lead vehicle based at least in part on the vehicle identifier.

In another embodiment, a method (e.g., for communicatively linking vehicles in a vehicle consist) includes receiving unique vehicle identifiers of remote vehicles included in a vehicle consist with a lead vehicle, communicating linking messages with the unique vehicle identifiers to the remote vehicles, and responsive to the unique vehicle identifiers in the linking messages matching the remote vehicles in the vehicle consist, establishing one or more communication links between the lead vehicle and the remote vehicles to permit the lead vehicle to remotely control movement of the remote vehicles included in the vehicle consist. The one or more communication links are established without an operator being onboard the remote vehicles to communicate responsive messages from the remote vehicles to the lead vehicle.

In one aspect, establishing the one or more communication links can include receiving one or more linking confirmation messages from the remote vehicles at the lead vehicle responsive to the linking messages being received at the remote vehicles without the operator being onboard the remote vehicles.

In one aspect, determining the vehicle identifiers can include receiving a list of one or more unique identifying codes associated with the remote vehicles from one or more of a vehicle control system that restricts movement of the vehicle consist based at least in part on a location of the vehicle consist and/or an energy management system that creates a trip plan to control movement of the vehicle consist. The trip plan can designate operational settings of the vehicle consist as a function of one or more of time or distance along a route.

In one aspect, the method also can include detecting a single instance of an operator actuating an input device onboard the lead vehicle and communicating the linking messages occurs responsive to detecting the single instance of the operator actuating the input device.

In another embodiment, a method (e.g., for communicatively linking vehicles in a vehicle consist) includes determining a first unique vehicle identifier for a first remote vehicle and a second unique vehicle identifier for a second remote vehicle included in a vehicle consist formed from a lead vehicle, the first remote vehicle, and the second remote vehicle, detecting a single instance of an operator actuating an input device onboard the lead vehicle, communicating from the lead vehicle a first wireless linking message addressed to the first unique vehicle identifier to the first remote vehicle and communicating a second wireless linking message addressed to the second unique vehicle identifier to the second remote vehicle responsive to detecting the single instance of the operator actuating the input device, establishing a first communication link between the lead vehicle and the first remote vehicle responsive to receipt of the first wireless linking message at the first remote vehicle and a second communication link between the lead vehicle and the second remote vehicle responsive to receipt of the second wireless linking message at the second remote vehicle (where the communication link is established without an operator entering the first remote vehicle or the second remote vehicle), and remotely controlling movement of the first remote vehicle and the second remote vehicle from the lead vehicle via the first communication link and the second communication link, respectively. Communicating the wireless linking message can include broadcasting the first wireless linking message and the second wireless linking message such that the first remote vehicle receives the first wireless linking message and the second remote vehicle receives the second wireless linking message and at least one other remote vehicle that is located within a wireless communication range of the lead vehicle but that is not included in the vehicle consist receives at least one of the first wireless linking message or the second wireless linking message. Establishing the first communication link between the lead vehicle and the first remote vehicle and the second communication link between the lead vehicle and the second remote vehicle can include preventing the at least one other remote vehicle from establishing a communication link with the lead vehicle based at least in part on the first unique vehicle identifier or the second unique vehicle identifier.

In another embodiment, a method (e.g., for communicatively linking vehicles in a vehicle system) includes receiving, at an energy management system disposed onboard a vehicle system formed from a lead vehicle and one or more remote vehicles, trip data that represents one or more characteristics of an upcoming trip of the vehicle system along a route and communicating a selected portion of the trip data from the energy management system to a distributed power system also disposed onboard the vehicle system. The selected portion includes identifying information and one or more orientations of the one or more remote vehicles. The method also includes establishing, using the distributed power system, wireless communication links between the lead vehicle and the one or more remote vehicles using the identifying information and the one or more orientations.

In one aspect, the energy management system that receives the trip data is configured to generate a trip plan for the upcoming trip of the vehicle using the trip data, the trip plan designating operational settings of the lead and remote vehicles.

In one aspect, movement of the one or more remote vehicles is remotely controlled from the lead vehicle using the operational settings designated by the trip plan by wirelessly communicating control signals from the lead vehicle to the one or more remote vehicles via the wireless communication links.

In one aspect, the trip plan designates the operational settings of the lead and remote vehicles as a function of one or more of time or distance along the route in order to reduce one or more of fuel consumed or emissions generated by the lead and remote vehicles relative to the lead and remote vehicles completing the upcoming trip using different operational settings than the operational settings designated by the trip plan.

In one aspect, the trip data includes an origin location of the trip, a destination location of the trip, the identifying information of the one or more remote vehicles, the one or more orientations of the one or more remote vehicles, order information of the one or more remote vehicles, and one or more speed restrictions of the route.

In one aspect, communicating the selected portion of the trip data and establishing the wireless communication links occurs automatically without operator intervention.

In one aspect, establishing the wireless communication links is completed prior to generating the trip plan.

In one aspect, the trip data is wirelessly received at the energy management system from a location disposed offboard the vehicle system.

In one aspect, the trip plan is generated without using the one or more orientations of the one or more remote vehicles.

In another embodiment, a system (e.g., a communication system) includes an energy management system and a control unit. The energy management system is configured to be disposed onboard a vehicle system formed from a lead vehicle and one or more remote vehicles, the energy management system configured to receive trip data that represents one or more characteristics of an upcoming trip of the vehicle system along a route. The control unit is configured to be disposed onboard the vehicle system and to establish wireless communication links between the lead vehicle and the one or more remote vehicles. The energy management system is configured to communicate a selected portion of the trip data to the control unit. The selected portion includes identifying information and one or more orientations of the one or more remote vehicles. The control unit is configured to establish the wireless communication links using the identifying information and the one or more orientations.

In one aspect, the energy management system is configured to generate a trip plan for the upcoming trip of the vehicle using the trip data. The trip plan designates operational settings of the lead and remote vehicles.

In one aspect, the control unit is configured to remotely control movement of the one or more remote vehicles using the operational settings designated by the trip plan by wirelessly communicating control signals from the lead vehicle to the one or more remote vehicles via the wireless communication links.

In one aspect, the trip plan designates the operational settings of the lead and remote vehicles as a function of one or more of time or distance along the route in order to reduce one or more of fuel consumed or emissions generated by the lead and remote vehicles relative to the lead and remote vehicles completing the upcoming trip using different operational settings than the operational settings designated by the trip plan.

In one aspect, the trip data includes an origin location of the trip, a destination location of the trip, the identifying information of the one or more remote vehicles, the one or more orientations of the one or more remote vehicles, order information of the one or more remote vehicles, and one or more speed restrictions of the route.

In one aspect, the energy management system is configured to communicate the selected portion of the trip data to the control unit and the control unit is configured to establish the wireless communication links automatically without operator intervention.

In one aspect, the control unit is configured to establish the wireless communication links prior to the energy management system generating the trip plan.

In one aspect, the energy management system is configured to wirelessly receive the trip data from a location disposed off-board the vehicle system.

In one aspect, the energy management system is configured to generate the trip plan without using the one or more orientations of the one or more remote vehicles.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:
1. A method comprising:
receiving, at an energy management system comprising one or more processors disposed onboard a vehicle system formed from a lead vehicle and one or more remote vehicles, trip data that represents one or more characteristics of an upcoming trip of the vehicle system along a route;
communicating a selected portion of the trip data from the energy management system to a control unit comprising one or more processors disposed onboard the lead vehicle of the vehicle system, the selected portion including vehicle identifiers associated with the one or more remote vehicles and one or more orientations of the one or more remote vehicles;
establishing, using the control unit, communication links between the lead vehicle and the one or more remote vehicles using the vehicle identifiers and the one or more orientations; and
remotely controlling movement of the one or more remote vehicles by the lead vehicle during the tin via the communication links.
2. The method of claim 1, further comprising generating, by the energy management system, a trip plan for the upcoming trip of the vehicle system using the trip data, the trip plan designating operational settings of the lead and remote vehicles.

3. The method of claim 2, wherein remotely controlling the movement of the one or more remote vehicles during the trip includes controlling the one or more remote vehicles to move according to the operational settings designated by the trip plan by wirelessly communicating control signals from the lead vehicle to the one or more remote vehicles via the communication links.

4. The method of claim 2, wherein the trip plan designates the operational settings of the lead and remote vehicles as a function of one or more of time or distance along the route in order to reduce one or more of fuel consumed or emissions generated by the lead and remote vehicles relative to the lead and remote vehicles completing the upcoming trip using different operational settings than the operational settings designated by the trip plan.

5. The method of claim 2, wherein establishing the communication links is completed prior to generating the trip plan.

6. The method of claim 2, wherein the trip plan is generated without using the one or more orientations of the one or more remote vehicles.

7. The method of claim 1, wherein the communication links are established by communicating, using a communication unit comprising a transceiver disposed onboard the lead vehicle, a wireless linking message to the one or more remote vehicles, the wireless linking message addressed to the vehicle identifiers associated with the one or more remote vehicles of the vehicle system, the communication links established responsive to receipt of the wireless linking message at the one or more remote vehicles.

8. The method of claim 1, wherein the trip data includes an origin location of the trip, a destination location of the trip, the vehicle identifiers associated with the one or more remote vehicles, the one or more orientations of the one or more remote vehicles, order information of the one or more remote vehicles, and one or more speed restrictions of the route.

9. The method of claim 1, wherein communicating the selected portion of the trip data and establishing the communication links occurs automatically without operator intervention.

10. The method of claim 1, wherein the trip data is wirelessly received at the energy management system from a location disposed off-board the vehicle system.

11. A system comprising:
an energy management system comprising one or more processors configured to be disposed onboard a vehicle system formed from a lead vehicle and one or more remote vehicles, the energy management system receives trip data that represents one or more characteristics of an upcoming trip of the vehicle system along a route; and
a control unit comprising one or more processors configured to be disposed onboard the lead vehicle of the vehicle system and to establish communication links between the lead vehicle and the one or more remote vehicles, wherein the energy management system communicates a selected portion of the trip data to the control unit, the selected portion including vehicle identifiers associated with the one or more remote vehicles and one or more orientations of the one or more remote vehicles, wherein the control unit establishes the communication links using the vehicle identifiers and the one or more orientations, wherein the control unit remotely controls movement of the one or more remote vehicles during the trip via the communication links.

12. The system of claim 11, wherein the energy management system is configured to generate a trip plan for the upcoming trip of the vehicle system using the trip data, the trip plan designating operational settings of the lead and remote vehicles.

13. The system of claim 12, wherein the control unit remotely controls the movement of the one or more remote vehicles during the trip such that the one or more remote vehicles move according to the operational settings designated by the trip plan by wirelessly communicating control signals from the lead vehicle to the one or more remote vehicles via the communication links.

14. The system of claim 12, wherein the trip plan designates the operational settings of the lead and remote vehicles as a function of one or more of time or distance along the route in order to reduce one or more of fuel consumed or emissions generated by the lead and remote vehicles relative to the lead and remote vehicles completing the upcoming trip using different operational settings than the operational settings designated by the trip plan.

15. The system of claim 11, wherein the energy management system is configured to communicate the selected portion of the trip data to the control unit and the control unit is configured to establish the communication links automatically without operator intervention.

16. The system of claim 11, wherein the energy management system is configured to wirelessly receive the trip data from a location disposed off-board the vehicle system.

17. The system of claim 11, further comprising a communication unit comprising a transceiver disposed onboard the lead vehicle and operatively connected to the control unit, the control unit controlling the communication device to communicate a wireless linking message that is addressed to the vehicle identifiers associated with the one or more remote vehicles of the vehicle system, wherein the communication links are established responsive to receipt of the wireless linking message at the one or more remote vehicles.

18. The system of claim 17, wherein the communication unit onboard the lead vehicle is configured to receive a linking confirmation message from the one or more remote vehicles of the vehicle system responsive to the wireless linking message being received at the one or more remote vehicles.

19. A system comprising:
a control unit comprising one or more processors disposed onboard a lead vehicle of a vehicle consist formed from the lead vehicle and at least a first remote vehicle, the control unit determines a vehicle identifier for the first remote vehicle; and
a communication unit comprising a transceiver disposed onboard the lead vehicle, the communication unit wirelessly communicates a linking message addressed to the vehicle identifier from the lead vehicle to the first remote vehicle, the communication unit establishes a communication link between the lead vehicle and the first remote vehicle responsive to receipt of the linking message at the first remote vehicle, wherein the control unit remotely controls movement of the first remote vehicle from the lead vehicle via the communication link, and wherein the communication link is established without an operator entering the first remote vehicle.

20. The system of claim 19, wherein the communication unit is configured to receive a linking confirmation message from the first remote vehicle at the lead vehicle responsive to the linking message being received at the first remote vehicle.

\* \* \* \* \*